(12) United States Patent
Larvoire et al.

(10) Patent No.: US 7,124,290 B2
(45) Date of Patent: Oct. 17, 2006

(54) METHOD AND SYSTEM FOR SELECTIVELY BOOTING ONE OF A PLURALITY OF OPERATING SYSTEMS CONTAINED ON A MASS STORAGE DEVICE

(75) Inventors: Jean-Francois Larvoire, Meylan (FR); Bruno Richard, Crolles (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 753 days.

(21) Appl. No.: 10/186,691

(22) Filed: Jul. 2, 2002

(65) Prior Publication Data

US 2003/0012114 A1  Jan. 16, 2003

(30) Foreign Application Priority Data

Jul. 3, 2001   (EP)  ................................. 01410082
Mar. 20, 2002  (EP)  ................................. 02354047

(51) Int. Cl.
*G06F 9/00* (2006.01)
*G06F 9/24* (2006.01)

(52) U.S. Cl. ......................................................... 713/1
(58) Field of Classification Search .................... 713/1, 713/2
See application file for complete search history.

(56) References Cited

U.S. PATENT DOCUMENTS

| 6,330,648 | B1 * | 12/2001 | Wambach et al. | 711/163 |
| 6,367,074 | B1 * | 4/2002 | Bates et al. | 711/170 |
| 6,430,663 | B1 * | 8/2002 | Ding | 711/162 |
| 6,691,213 | B1 * | 2/2004 | Luu et al. | 711/163 |
| 6,711,660 | B1 * | 3/2004 | Milne et al. | 711/173 |
| 2002/0016909 | A1 * | 2/2002 | Miyajima | 713/2 |

* cited by examiner

*Primary Examiner*—Lynne H. Browne
*Assistant Examiner*—Matthew A. Henry
(74) *Attorney, Agent, or Firm*—Foley & Lardner LLP

(57) ABSTRACT

A computer system includes a mass storage unit, the mass storage unit comprising:
  a first portion which contains a first operating system;
  a second portion distinct from the first portion;
wherein:
  the second portion stores the value of an address comprised in the first portion and at which a boot record of the first operating system is located;
  the first portion has a sub-portion containing a second operating system;
  the second portion further stores the value of another address comprised in the first portion and which is the address of a boot record of the second operating system,
whereby the second operating system can be activated without the first operating system being active.

21 Claims, 2 Drawing Sheets

METHOD AND SYSTEM FOR SELECTIVELY BOOTING ONE OF A PLURALITY OF OPERATING SYSTEMS CONTAINED ON A MASS STORAGE DEVICE

TECHNICAL FIELD

The invention relates to computer systems and the partitioning of computer mass storage units such as hard disks especially when two operating systems are present on the disk.

CROSS-REFERENCE TO RELATED APPLICATIONS

In copending application Ser. No. 10/186,689, filed on Jul. 2, 2002, entitled SYSTEM AND METHOD TO ENABLE A LEGACY BIOS SYSTEM TO BOOT FROM A DISK THAT INCLUDES EFI GPT PARTITIONS, assigned to the assignee of the present invention and incorporated herein by this reference, there is described a method enabling a legacy bios system to boot from a disk that includes EFI GPT partitions. Although not limited thereto, the present invention employs such a method in at least one of its embodiments.

BACKGROUND ART

Referring to FIG. 1, the typically partitioned hard disk includes three main parts 10, 20 and 30. A first part 10 is dedicated to a master boot record (MBR). The master boot record is a small piece of code that is executed when a computer boots up. Typically, the MBR resides on the first sector of the hard disk of a computer. The MBR can also reside on removable media such as a floppy disk or CDROM which may be used to boot the computer. The MBR contains a partition table that is used to determine which partition to use for booting. The boot process transfers program control to the boot sector of that partition, which continues the boot process. Thus, the MBR includes a table of addresses and a set of instructions for loading a boot sector of an operating system.

A partition divides memory into isolated sections. In DOS systems, a disk can be partitioned, and each partition behaves like a separate disk drive. Partitioning is particularly useful if it is intended to run more than one operating system on a machine. For example, one partition might be reserved for Windows and another for UNIX.

A second part 20 of a legacy-partitioned hard disk is known as the end of track. This is unused except by some setup programs in WINDOWS OS. The reason for the end of track 20 is that the legacy partitioning scheme requires a partition to start on a track boundary, and the MBR 10 does not occupy the entire track. The end of track 20 occupies the remainder of the first track not occupied by the MBR 10.

End-of track 20 forms a forbidden part in the sense that it is not listed in the table of addresses of the master boot record. A third part 30 stores an operating system, and in particular a boot sector of the operating system, which is listed in the table of addresses of the master boot record. The third part 30 includes a main active partition and up to three other partitions, whereby these 'extended partitions' may be further sub-partitioned.

It is known to use the forbidden part for locating some maintenance tools and also, to store a Globally Unique Identifier Extensible Firmware Interface GUID Partition Table (GUID-EFI-GPT), developed by INTEL, for locating a second table of addresses.

According to this boot scheme, firmware accesses the second table without reading the instructions contained in the master boot record.

When operating a computer, it is often necessary to use a supplementary operating system, particularly for maintenance tasks. For example it can be necessary to activate a lower level operating system such as DOS for reflashing the BIOS of a computer. A second operating system may be loaded by means of a command interpreter contained on removable media such as a floppy disk or a CDROM.

It has also been proposed to store a second operating system, in the partition corresponding to the main operating system, in the form of a series of files relating to the first operating system (OS). Those files are stored as other files in the partition of the first operating system.

However, such systems do not generally provide the full functionality of a supplementary operating system. Moreover, in such a situation, it is necessary to load or activate the first operating system in order to load the second one. Furthermore such systems can sometimes be unreliable in terms of hardware and software conflicts.

It is also known to provide software tools which can change the partition configuration of an initially single-OS-disk. These can be used to reduce the size of the partition dedicated to the main operating system, and create a fourth partition in the space initially contained in the third partition. The fourth partition may then be loaded with the second operating system. However such software tools can be complex and expensive. Further, they can be difficult to use and, given the relatively low-level at which their operation is generally carried out, the consequences of a mistake can render a disk unusable.

SUMMARY OF THE INVENTION

This invention provides a computer system including a mass storage unit, the mass storage unit comprising:
 a first portion which contains a first operating system;
 a second portion distinct from the first portion;
wherein:
 the second portion stores the value of an address comprised in the first portion and at which a boot record of the first operating system is located;
 the first portion has a sub-portion containing a second operating system;
 the second portion further stores the value of another address comprised in the first portion and which is the address of a boot record of the second operating system, whereby the second operating system can be activated without the first operating system being active.

The invention also provides a mass storage unit for a computer system, the mass storage unit including:
 a first portion which contains a first operating system;
 a second portion distinct from the first portion;
 wherein:
 the second portion stores the value of an address located in the first portion and at which a boot record of the first operating system is located;
 the first portion has a sub-portion containing a second operating system,
 the second portion further stores the value of another address located in the first portion and which is the address of a boot record of the second operating system, whereby the second operating system can be activated without the first operating system being active.

Preferably the sub-portion is listed in the first operating system as only one file.

BRIEF DESCRIPTION OF THE DRAWINGS

An embodiment of the present invention will now be described by way of example only and with reference to the drawings in which.

A sector is the smallest unit of memory that can be accessed on a disk. When a disk undergoes a low level format, it is divided it into tracks and sectors. Tracks are concentric circles around the disk and the sectors are segments within each circle. The operating system and disk drive keep tabs on where information is stored on the disk by noting its track and sector number. It is to be understood that a reference to sector can be replaced by another type of memory location group.

The definition of the term "partition" has been given in the background discussion above.

Figure 1:
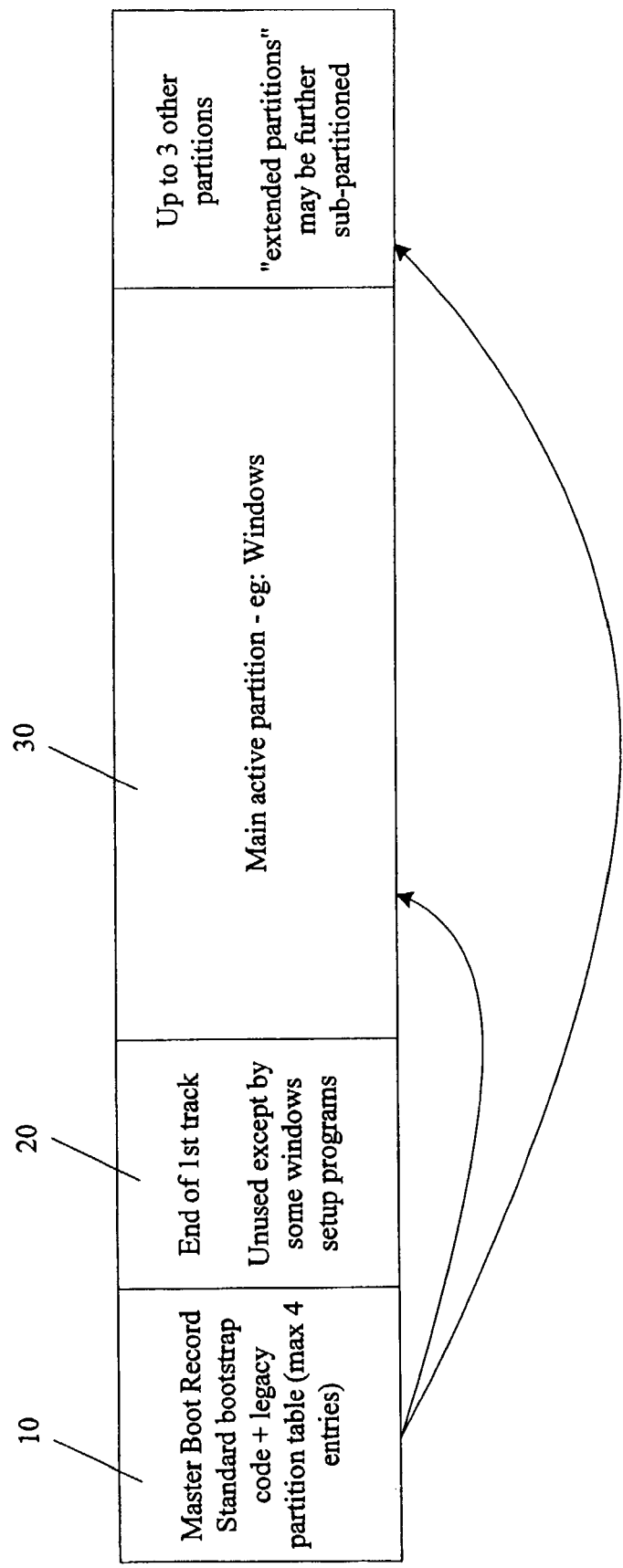
FIG. 1: illustrates a schematic representation of a hard disk according to prior art.
Figure 2:
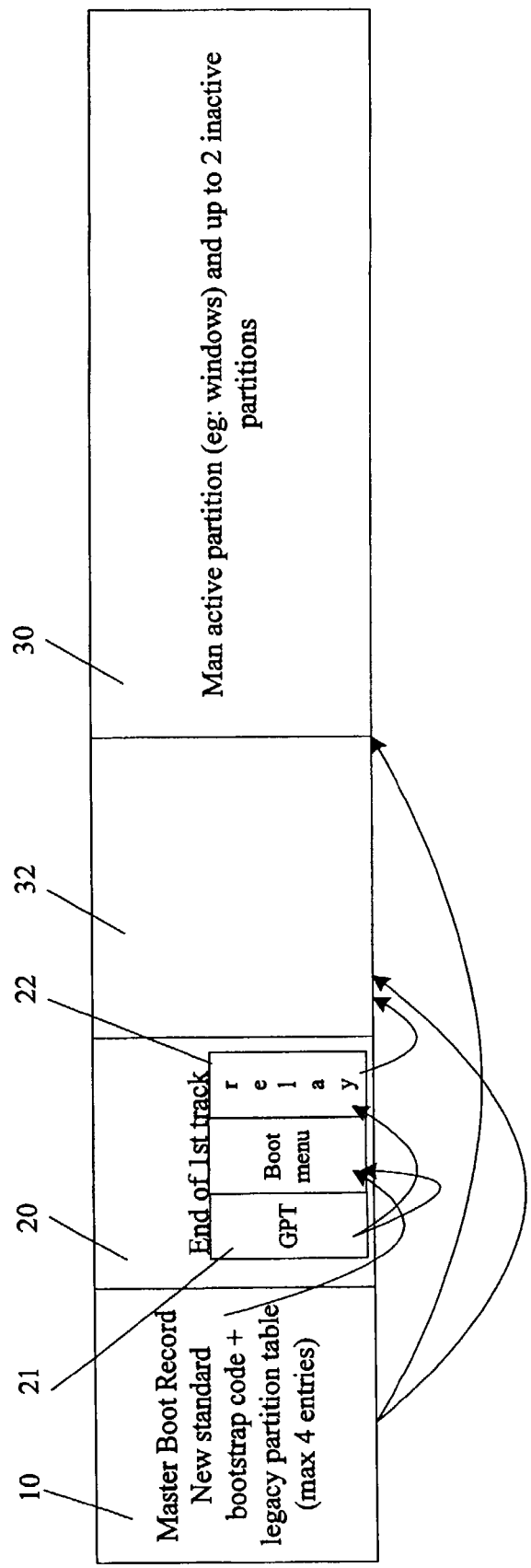
FIG. 2: illustrates a schematic representation of a hard disk incorporating a second operating system.

Referring to FIG. 2, the hard disk according to the preferred embodiment of the invention can be considered to be constituted by three main parts 10, 20 and 30 in the same general manner as the known disk of FIG. 1, i.e. a master boot sector partition 10, an end-of-track or forbidden partition 20, and an operating system partition 30.

According to this embodiment of the invention, the third partition 30 also includes a second or supplementary operating system. This second operating system is represented in FIG. 2 by a unique block 32 placed at the beginning of this partition 30, adjacent the forbidden partition 20.

This area of disk memory 32 is so illustrated to symbolize the fact that, in the present case, such a part 32 is preferably contiguous and unmovable in partition 30.

The fact that part 32 is unmovable and contiguous allows the file system of the first operating system to 'contain' the secondary OS. Generally, most operating systems expect to have their 'own' partition which must be a contiguous block of disk space, and most operating systems have pointers to absolute locations on the disk, not just locations relative to such a partition.

The contiguous feature is ensured by the fact that the location of part 32 has been established by scanning the disk looking for a free contiguous block large enough for the second operating system. It is noted that the dimensions of the figures are schematic only and do not represent the true relative dimensions of disk space.

This part 32 of the second operating system is embedded in the partition 30 which is dedicated to the first operating system. This part 32 corresponds to a file conforming to and readable by the first operating system.

According to the exemplary embodiment, part 32 can be considered to be a partition since it is contiguous and immoveable and this partition is embedded in partition 30 as it is recognized as a file by the main operating system. The main operating system is Windows in the present preferred embodiment although with suitable modification, the invention may be applied in the context of other operating systems.

The "immoveable" characteristics of the secondary operating system file 32 are ensured by the fact that the secondary OS file attribute is set to "system" (s). The actual notation of the attribute may vary depending on the particular operating system. Such a declaration is made by setting the flag or attribute "system". This prevents the first operating system from moving the file.

Apart from the fact that the file containing the second operating system may be immoveable and contiguously stored, this file has also the following features.

The file is preferably of hidden type as this reduces the chance of a user accidentally or intentionally deleting the file. Typical operating systems, which may constitute the main operating system, such as Windows, provide a "hidden" file flag or attribute (h).

Furthermore, the file is protected from modifications through the first operating system. To this end, the files attribute is set to include "read only" (r) as recognized by the first operating system. The flag "read only" prevents the first operating system from writing to, or over, this file.

Equivalent "system", "hidden" and "read only" flags, attributes or equivalents are used by most common operating systems.

The "r", "h", "s" flags protect the subject file from deletion or modification and also from disk fragmenters. Defragmenters recognize such files by the fact that these files have, depending on the particular OS, three bits corresponding respectively to "r", "h" and "s" flags set to active.

Furthermore, the file is preferably as close as possible to the beginning of the disk. This is because several operating systems do not support booting from a partition beginning after a given memory location threshold, such as 4 GB for example.

Embedded partition 32 itself includes a boot sector (not shown), i.e. a sector that is the first to be loaded into Random Access Memory when an OS is to be booted. The boot sector is generally the first sector of the partition.

The second operating system is associated with means for loading the second operating system at boot-up.

This arrangement allows the second operating system to be booted without the first one necessarily being active.

To this end, the part of the disk corresponding to partitions 10 and 20 stores the value of the address of the boot sector of this second operating system and also stores a set of instructions for loading this boot sector.

The boot sectors of both operating systems are thus referred to in the portion constituted by partitions 10 and 20.

As is known in the prior art, the boot sector of the main operating system is referred to in the partition table of the master boot record 10 (legacy partition table).

A master boot record, as known in the prior art, is typically located in the first sector of the disk. This first sector is initially loaded in Random Access Memory when the computer is booted-up. A master boot record or master boot sector includes a set of instructions which controls the loading of other partitions at addresses contained in the partition table.

The boot sector of the second operating system is therefore, according to the present embodiment, not referred to in this 'legacy' partition table.

As the boot sector of the second operating system is referred to in the portion corresponding to partitions 10 and 20, the partition tools will treat such a part 32 as a true partition.

Some repartitioning tools such as Partition Magic do not recognize that the legacy partition table refers to two boot sectors placed in partition 30. Such addresses would be interpreted by the repartitioning tool as referring to overlapping partitions, which are not recognized by the tools.

According to the present embodiment, the second operating system is indirectly referred to in a second table of addresses, which is stored in the forbidden partition 20.

It is known to refer to some sectors in a partition table contained in a GPT (global unique identifier partition table) sector, in the forbidden partition 20. Specifically, the EFI- GPT scheme proposes to adopt firmware means for reading, at boot-up, a particular sector of the forbidden partition without previously reading the instructions from the master boot record.

The EFI-GPT scheme is such that large amounts of memory are placed in the forbidden partition 20, in particular memory corresponding to an operating system. The partition table of the GPT scheme can comprise substantially more than four addresses, in comparison with the legacy partition table. According to the known GPT scheme, the table contained in the GPT sector does not specify addresses which are outside the forbidden partition 20. Information regarding the standard GPT is well known in the art.

In other words, the GPT sector 21 is linked, in this case indirectly, to the second operating system. This will be described below. This feature allows EFI-GPT computers to access the second operating system with an EFI-BIOS without loading the master boot record 10.

In other words, the GPT sector is linked, in this case indirectly, to the second operating system. This will be described below. This feature allows EFI-GPT computers to access the second operating system with an EFI-BIOS without loading the master boot record.

GPT-aware partitioning tools generally do not recognize that addresses located in partitions other than the forbidden partition can be specified in the partition table of the GPT sector 21. Furthermore, some GPT-aware repartitioning tools conflict with the master boot record 10 and the GPT sector 21 referring to addresses which are both in partition 30.

In the present case, the second table specifies an address of an intermediary sector 22, located in forbidden partition 20. This intermediary sector 22 specifies the true address of the boot sector of the second partition in part 32. Intermediary sector 22 also includes a set of instructions for loading the boot sector of the second OS. Thus, in a sense, this intermediary sector 22 can be thought of as a relay sector which is used to allow the GPT system to access a sector which is outside of the area normally managed by the GPT.

The relay sector 22 includes a table having only one entry and some code for loading the boot sector of the second OS. The addresses which are read in the above-mentioned tables are disk memory addresses/locations. In particular, the relay 22 indicates the true location of the boot sector of the second OS.

In the present case, relay sector 22 contains a relay partition header which stores the name and the location of the embedded partition 32. The relay partition 22 is itself renamed (in the descriptor entry in the GPT) with the same name as the boot sector of subpartition 32. This way, the name of the second OS is visible in the GPT sector 21.

The present disk is configured so that the user can choose either operating system. Furthermore, the disk can be accessed either by a computer according to the usual master boot record scheme or according to the new EFI-GPT scheme.

To this end, the effect is such that the master boot record 10 includes means which initiates a link to the partition table of the forbidden partition 20. As master boot record 10 cannot refer, through its partition table, to some sectors of partition 20 (the forbidden partition) the present master boot record makes an indirect link to GPT 21 by initiating a link to this sector in its set of instructions.

In the present preferred embodiment, this custom set of instructions in the master boot record 10 does not analyze the partition table of the master boot record 10.

The master boot record 10 stores a reduced set of instructions which only redirects to the more detailed code stored in a boot menu 23 in the forbidden partition 20. This boot menu 23 code is able to analyze both partition tables.

The set of instructions contained in the master boot record 10 controls reading the boot menu sector 23, which itself stores the value of the address of the GPT 21 and instructions for reading the partition table of GPT sector 21.

In other words, the master boot record 10 makes a code link to the forbidden partition 20 and the known legacy partition table makes a normal direct link to the first OS. The legacy partition table refers to the boot sector of the main operating system.

The boot menu 23 here includes only instructions. Further, the boot menu is not used on EFI-GPT computers, which have their own boot menu built in ROM (Read Only Memory).

It is constituted by a sector 23 in forbidden partition 20 which can be accessed by non EFI-GPT computers having read the set of instruction standard computer.

At boot-up of a standard legacy scheme computer equipped with the present disk, master boot record 10 is first read. It then redirects, by its code, into boot menu 23. Boot menu 23 stores a set of instructions for offering the user the choice between the two operating systems. If the user chooses the second OS, boot menu 23 controls reading of the corresponding sector specified in the table of addresses of the GPT sector 21, i.e. the relay sector 22. The relay sector 22 itself specifies the address of the boot sector of the second OS and stores instructions for loading it.

Alternatively, if the user selects to boot with the first operating system, the boot menu 23, operating according to the instructions in the master boot record 10, reads the legacy partition table and reads the boot sector specified in the legacy partition table, i.e. the boot sector of the main operating system.

As mentioned above, an EPI-GPT computer can boot both operating systems contained on the same disk, as the GPT sector 21 is processed directly by the boot menu built in ROM. The boot menu built in ROM then loads a sector specified either in the legacy partition table or in the partition table of GPT sector 21. That is, it loads either the boot sector of the first OS, or via relay 22, the OS chosen by the user. To this end, the boot menu 23 is able to read both partition tables.

In other words, the computer follows directly the instructions stored in the boot menu 23 and then follows the same steps as for booting the computer according to the master boot record 10.

A disk or similar media in accordance with the invention is thus adapted to both schemes and adapted to offer the choice between two or more operating systems whatever the scheme is used as primary access to this disk.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

What is claimed is:

1. A computer system including a mass storage unit, the mass storage unit comprising:

a first portion which contains a first operating system;

a second portion distinct from the first portion;

wherein:
the second portion stores the value of an address comprised in the first portion and at which a boot record of the first operating system is located;
the first portion has a sub-portion containing a second operating system;
the second portion further stores the value of another address comprised in the first portion and which is the address of a boot record of the second operating system, whereby the second operating system can be activated without the first operating system being active,
wherein the second portion of the mass storage unit comprises a master boot record and a forbidden portion, said master boot record storing a table of addresses and a set of instructions for loading other portions than the master boot record so that the master boot record can be the first portion of the mass storage unit loaded in a remote access memory of the computer at the booting of the computer, said forbidden portion being distinct from the master boot record and not designated either partially or indirectly by way of the table of addresses of the master boot record, and wherein the forbidden portion includes a second table of addresses among which addresses one designates indirectly the boot record of the second operating system.

2. The computer system of claim 1, wherein said second operating system is stored in the form of a contiguous part of the first portion.

3. The computer system as claimed in claim 1, wherein the part forming the second operating system is declared unmovable in the first operating system.

4. The computer system of claim 1, wherein the file forming the part which includes the second operating system is declared as unchangeable in the first operating system.

5. The computer system of claim 1, wherein said second operating system is stored in the form of a contiguous part of the first portion and wherein the file forming this part is declared in the first operating system as being of hidden type in the first operating system.

6. The computer system of claim 1, wherein the mass storage unit comprises, in the forbidden portion, a relay portion which stores the address of the boot record of the second operating system as well as instructions for loading the boot record of the second operating system, and in that said second table of addresses includes an address which designates said relay portion.

7. The computer system of claim 1, wherein the computer system further comprises means for reading the second table and wherein the set of instructions of the master boot record comprises instructions for launching those means for reading the second table.

8. The computer system of claim 7, wherein said means for reading the second table include a set of instructions for reading the second table, which set of instructions is located in the forbidden portion.

9. The computer system of claim 1, wherein the forbidden portion stores a set of instructions for offering the choice to a user between the first and the second operating system, and for loading a part of the forbidden portion at an address specified in the second table in the case the second operating system is chosen.

10. The computer system of claim 9, wherein the forbidden portion includes a set of instructions for loading a part of the first portion at an address specified in the table of addresses of the master boot record in case the first operating system is chosen.

11. The computer system of claim 1, wherein said second table of addresses includes only addresses of parts which are included in the forbidden portion.

12. The computer system of claim 11, wherein the second table is stored in a GPT portion of the mass storage unit.

13. The computer system of claim 1, wherein the mass storage unit stores a set of instructions for identifying a failure in activating an operating system and a set of instructions for automatically loading the boot record of the other of the two operating systems in case of such an identified failure.

14. A computer system including a mass storage unit, the mass storage unit comprising:
a first portion which contains a first operating system;
a second portion distinct from the first portion;
wherein:
the first portion has a sub-portion containing a second operating system stored in the form of a contiguous part of the first portion;
the second portion of the mass storage unit comprises a master boot record and a forbidden portion, said master boot record storing a table of addresses and a set of instructions for loading other portions than the master boot record so that the master boot record can be the first portion of the mass storage unit loaded in a remote access memory of the computer at the initiating of the computer, said forbidden portion being distinct from the master boot record and not designated either partially or indirectly in the table of addresses of the master boot record, and wherein the forbidden portion includes a second table of addresses and a relay portion which stores the address of the boot record of the second operating system as well as instructions for loading the boot record of the second operating system, said second table of addresses including an address which designates said relay portion,
whereby the second operating system can be activated without the first operating system being active.

15. The computer system as claimed in claim 14 wherein the part forming the second operating system is declared unmovable in the first operating system.

16. The computer system of claim 15, wherein the file forming the part which includes the second operating system is declared as unchangeable in the first operating system.

17. The computer system of claim 16, wherein said second operating system is stored in the form of a contiguous part of the first portion and wherein the file forming this part is declared in the first operating system as being of hidden type in the first operating system.

18. The computer system of claim 14, wherein the computer system further comprises means for reading the second table of addresses and wherein the set of instructions of the master boot record comprises instructions for launching those means for reading the second table of addresses.

19. The computer system of claim 18, wherein said means for reading the second table include a set of instructions for reading the second table, which set of instructions is located in the forbidden portion.

20. The computer system of claim 14, wherein said sub-portion being declared in the first operating system as only one file.

21. The computer system of claim 14, wherein said second table of addresses is a GPT.

* * * * *